US007482923B2

(12) United States Patent
Fitzgibbon

(10) Patent No.: US 7,482,923 B2
(45) Date of Patent: Jan. 27, 2009

(54) ALARM SYSTEM INTERACTION WITH A MOVABLE BARRIER OPERATOR METHOD AND APPARATUS

(75) Inventor: James J. Fitzgibbon, Batavia, IL (US)

(73) Assignee: The Chamberlain Group, inc., Elmhurst, IL (US)

( * ) Notice: Subject to any disclaimer, the term of this patent is extended or adjusted under 35 U.S.C. 154(b) by 274 days.

(21) Appl. No.: 11/044,928

(22) Filed: Jan. 27, 2005

(65) Prior Publication Data

US 2006/0176171 A1 Aug. 10, 2006

(51) Int. Cl.

| | |
|---|---|
| ***G08B 13/08*** | (2006.01) |
| ***G08B 1/08*** | (2006.01) |
| ***G08B 13/00*** | (2006.01) |
| ***G05B 19/00*** | (2006.01) |

(52) U.S. Cl. ............................ 340/545.1; 340/539.14; 340/541; 340/5.7; 340/5.71

(58) Field of Classification Search ...................... None
See application file for complete search history.

(56) References Cited

U.S. PATENT DOCUMENTS

| | | | | |
|---|---|---|---|---|
| 5,565,843 | A * | 10/1996 | Meyvis | 340/691.6 |
| 5,596,840 | A * | 1/1997 | Teich | 49/26 |
| 5,805,064 | A * | 9/1998 | Yorkey | 340/550 |
| 6,127,740 | A * | 10/2000 | Roddy et al. | 307/10.1 |
| 6,131,019 | A * | 10/2000 | King | 455/99 |
| 2001/0011941 | A1* | 8/2001 | King et al. | 340/5.64 |
| 2005/0134426 | A1* | 6/2005 | Mullett et al. | 340/5.7 |
| 2005/0170777 | A1* | 8/2005 | Harwood et al. | 455/41.2 |
| 2006/0077035 | A1* | 4/2006 | Mamaloukas | 340/5.61 |

OTHER PUBLICATIONS

WWW.brinkshomesecurity.com/home-security-systems-and-pricing/security-equipjent/security-equipment.htm.*

* cited by examiner

*Primary Examiner*—Julie Lieu
(74) *Attorney, Agent, or Firm*—Fitch, Even, Tabin & Flannery

(57) ABSTRACT

A secure communication link (24) is provided between a movable barrier operator (23) and a peripheral alarm system (20). Information conveyed via this link is used by one, the other, or both such elements to further inform or direct their respective actions.

15 Claims, 1 Drawing Sheet

ALARM SYSTEM INTERACTION WITH A MOVABLE BARRIER OPERATOR METHOD AND APPARATUS

TECHNICAL FIELD

This invention relates generally to movable barrier operators and more particularly to communications therewith.

BACKGROUND

Movable barrier operators of various kinds are known in the art. Such movable barrier operators often work in conjunction with a corresponding movable barrier such as a single panel or segmented garage door, a rolling shutter, a pivoting, swinging, or sliding gate or arm barrier, and so forth. In particular, the movable barrier operator typically responds to user inputs (often as input via a remotely located user interface) to effect selective movement of a corresponding movable barrier (for example, to transition the movable barrier back and forth between a closed and an opened position). Some movable barrier operators have additional functionality. For example, some movable barrier operators are able to control the illumination state of one or more light sources.

Alarm systems, including but not limited to intrusion detection alarm systems, are also known in the art. Such systems often serve to monitor one or more intrusion detectors and to respond to a detected intrusion with a corresponding action. Exemplary actions include sounding an audible alarm, illuminating or flashing one or more light sources, automatically sourcing a page, telephone call, or the like to notify one or more predetermined parties of the detected intrusion, and so forth.

In many cases, a building or residence having an alarm system will also have one or more movable barrier operators. There have been some prior efforts to effect communications and/or cooperation as between such elements. For example, the X10 standard has been employed to effect relatively simplistic communications (such as indicating a present status of a movable barrier to an alarm system or to permit an alarm system controller to also control activation of a movable barrier operator).

To date, such proposals are relatively simple and do not permit or facilitate much potential depth or capacity with respect to leveragable functionality. As a practical result, for the most part, little integration has occurred in the marketplace. At least one problem posed by seeking more powerful cooperation between such elements relates to increasing the likelihood that an unauthorized individual may be able to take advantage of the necessarily expanded communication link(s) as are used to support such cooperation and thereby impair or defeat the alarm system itself, the movable barrier operator, or both. Another problem reflects an apparent present perception on the part of at least some persons skilled in the art that the possible benefits of supporting such cooperation are relatively negligible in comparison to the perceived costs of implementation and risk to overall security and effectiveness.

BRIEF DESCRIPTION OF THE DRAWINGS

The above needs are at least partially met through provision of the alarm system interaction with a movable barrier operator method and apparatus described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, one provides a secure communication link between a movable barrier operator and a peripheral alarm system and then effects at least one communication between these elements using that secure communication link.

The secure communication link can comprise, for example, an encrypted wireless communication link, a non-wireless communication link, or the like. The communication can comprise, for example, data such as, but not limited to, an instruction to the movable barrier operator. Depending upon the needs of a given application, the peripheral alarm system can be responsive to data as is received from the movable barrier operator and/or the movable barrier operator can respond to operational instructions as are sourced by the peripheral alarm system.

Various capabilities and corresponding benefits are readily facilitated by these actions. As an illustrative example, when a given alarm system has a corresponding actuation time delay (to permit, for example, a home owner to vacate their premises prior to the alarm system arming itself), use and/or control of that actuation time delay can be further informed, controlled, or influenced by a present (or recent) operational state of a corresponding movable barrier operator. For example, the actuation time delay may be effectively lengthened (or shortened) as a function, at least in part, of whether the garage door of a home is opened, opening, closed, or closing.

Figure 1:
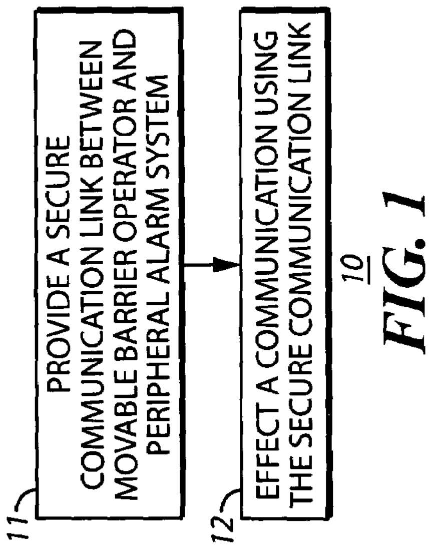
FIG. 1 comprises a flow diagram as configured in accordance with various embodiments of the invention.

These and other benefits may become clearer upon making a thorough review and study of the following detailed description. Referring now to the drawings, and in particular to FIG. 1, these teachings generally encompass a process 10 that provides 11 a secure communication link between a movable barrier operator and a peripheral alarm system. The secure communication link generally comprises a monitoring resistant pathway such as, but not limited to, an encrypted wireless communication link (based, for example, on a radio frequency or light frequency carrier), a non-wireless communication link (such as, for example, an electrical or optical signal conduit) and so forth.

Certain approaches to securing such a communication path are set forth in a co-pending and co-owned patent application bearing Ser. No. 11/044,411 entitled METHOD AND APPARATUS TO FACILITATE TRANSMISSION OF TERNARY MOVABLE BARRIER OPERATOR INFORMATION and as filed on even date herewith, the contents of which are fully incorporated herein by this reference.

Depending upon the needs of a given application setting, the secure communication link can comprise a dedicated link as between the movable barrier operator and the peripheral alarm system or can be shared or multiplexed in some manner with other elements. (Those skilled in the art will recognize that additional other communication links, including either or both secure and non-secure communication links, can also be provided as between the movable barrier operator and the peripheral alarm system, if desired.)

This process 10 then generally effects 12 at least one communication as between the movable barrier operator and the peripheral alarm system using the secure communication link. This communication can be directed from the movable barrier operator to the peripheral alarm system and/or vice versa, depending upon the needs and capabilities that characterize a given application setting. Pursuant to a preferred approach this communication comprises, at least in part, data (such as status information as pertains to one or the other of the movable barrier operator and the peripheral alarm system, confirmation messages, instructions, and so forth).

Effecting 12 this communication can also comprise, in a given deployment, effecting an action at one and/or the other of the movable barrier operator and the peripheral alarm system in response to receiving and/or sourcing the at least one communication. For example, the communication itself can comprise an instruction to the movable barrier operator regarding subsequent movement of a movable barrier as is controlled, at least in part, by the movable barrier operator. In such a case, the movable barrier operator may then respond to receipt of this instruction with a compliant action to cause the movable barrier to move as instructed. As another example, the peripheral alarm system may effect a given action as a function, at least in part, of receiving data from the movable barrier operator.

So configured, a movable barrier operator and a peripheral alarm system are able to communicate with one another with respect to information that may be useful to their relative operating strategies and/or with respect to specific instructions that one element can usefully execute to benefit or otherwise match or supplement the operations of the opposing element.

Figure 2:
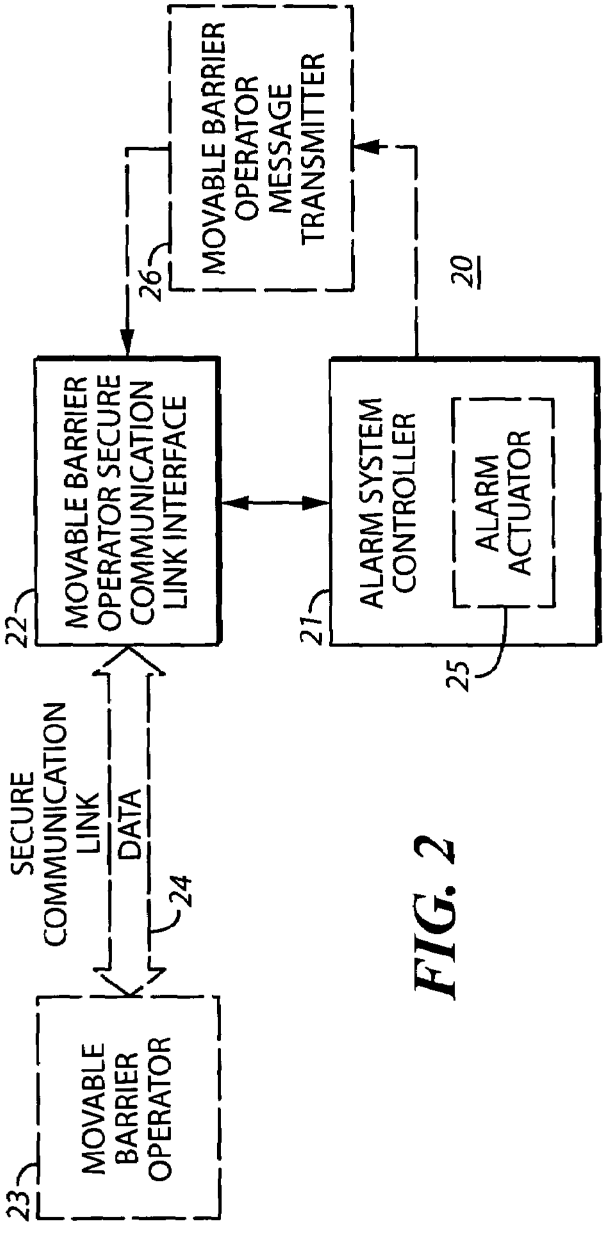
FIG. 2 comprises a block diagram as configured in accordance with various embodiments of the invention.

There are various ways to effect the above-described process 10. An illustrative example will now be set forth with reference to FIG. 2.

In this illustrative embodiment, an alarm control system 20 comprises an alarm system controller 21 that serves to generally receive data (regarding, for example, a monitored premises), to process that data with respect to various rules and tests, and to provide alarms and other actions in accordance with a given operating strategy. Such alarm system controllers 21 are generally well understood in the art. In addition, these teachings are not especially sensitive to the selection or use of any particular alarm system controller. Therefore, further elaboration will not be provided here for the sake of brevity and the preservation of narrative focus aside from noting that such alarm system controllers 21 are often partially or wholly programmable and can therefore be readily programmed to operate as described herein.

In this illustrative embodiment the alarm system controller 21 operably couples to a movable barrier operator secure communication link interface 22. The latter, in turn, comprises the interface that effects compatible interaction with a corresponding movable barrier operator 23 via a given secure communication link 24. So configured, the alarm system controller 21 is able to receive data from the movable barrier operator 23 via the secure communication link 24. As per these teachings, the alarm system controller 21 is then able to respond in some appropriate way to such received data.

In a preferred approach, the alarm system controller 21 comprises, in part, an alarm actuator 25. This alarm actuator 25, in a preferred embodiment, has a corresponding actuation time delay and serves, for example, to delay the arming of the alarm system in order to permit an authorized user to leave their house without fear that an alarm will sound upon detecting the opening of the egress door. In such a case (i.e., when the alarm actuator 25 comprises at least in part an alarm arming actuator), the operation of the alarm actuator 25 can be modified appropriately in response to receipt of information from a corresponding movable barrier operator. For example, arming of the alarm system can be delayed longer than is usual upon being advised by the movable barrier operator that the movable barrier operator's movable barrier (such as a garage door) has been opened but not yet closed (which may indicate, for example, that the authorized user has not yet completely left the premises).

As another example, when the alarm actuator 25 comprises an alarm disarming actuator (to automatically disarm the alarm system when it is otherwise armed), information received from the movable barrier operator can again be used to influence and inform this disarming functionality. To illustrate, when the movable barrier operator receives a remote control signal comprising an instruction to open the movable barrier, this information can be passed to the alarm system controller 21 as per these teachings and then used to trigger a full or temporary disarming of the alarm system in anticipation of the arrival of an authorized user.

Such actions can vary with the needs and requirements of a given application and can also vary with the substantive content of the conveyed information. Similarly, the precise information conveyed can vary with the needs and requirements of a given setting. Some illustrative examples include, but are certainly not limited to:

- reception of a remotely sourced movable barrier operator command signal;
- a current position of a movable barrier;
- initiation of movement of the movable barrier;
- current movement of the movable barrier;
- cessation of movement of the movable barrier;
- reversal of movement of the movable barrier;
- detection of an obstacle in a pathway of the movable barrier; and
- unauthorized movement of the movable barrier; to name a few.

As noted above, it may be useful in some settings for the alarm system controller 21 to itself convey information to a movable barrier operator (to permit, for example, providing a specific instruction to the movable barrier operator such as an instruction to illuminate one or more lights, to move the movable barrier to a particular position, to maintain a present position of the movable barrier, and so forth). In such a case a movable barrier operator message transmitter 26 can be provided to effect such transmissions. (Those skilled in the art will recognize and appreciate that such functionality can comprise stand-alone capability (as suggested by the illustration) or can be integrated with other elements of the alarm system such as the alarm system controller 21 and/or the movable barrier operator secure communication link interface 22.)

Figure 3:
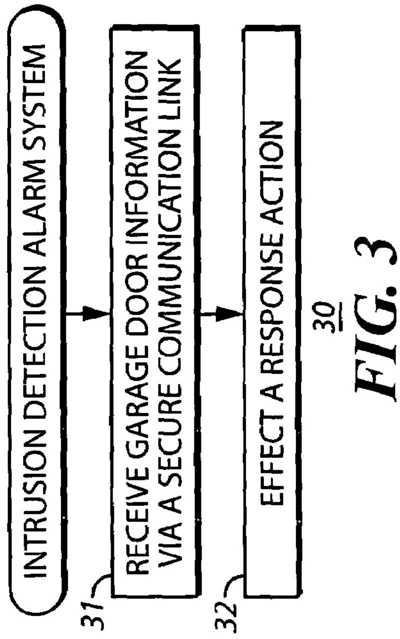
FIG. 3 comprises a flow diagram as configured in accordance with various embodiments of the invention.

Referring now to FIG. 3, and pursuant to a preferred though optional approach, an intrusion detection alarm system is preferably configured and programmed 30 to, upon receiving 31, via a secure communication link, information regarding at least one of an operational status and received operational commands as corresponds to a movable barrier operator (such as, for example, a garage door opener), by automatically effecting 32 at least one responsive action (such as an action that corresponds to at least one of arming and disarming an intrusion detection alarm). As one illustrative example, some movable barrier operators are able to detect an unauthorized opening of a movable barrier (in some cases, such a movable barrier operator is then further configured to oppose that opening movement of the movable barrier by using a motor to drive the movable barrier back to a predetermined position (such as a fully closed position)). Pursuant to these teachings, such a movable barrier operator could also, upon detecting an unauthorized opening of a movable barrier, provide a corresponding signal to a peripheral alarm system. The latter could then, for example, respond by sounding an alarm, illuminating one or more lights, transmitting an automated request for assistance, or the like.

Pursuant to one approach, the effected action can comprise, at least in part, the transmission of an external communication (such as, but not limited to, a command to the garage door opener, an inquiry to the garage door opener, a command to a peripheral alert mechanism, a message (intended, for example, for an authorized or unauthorized user of the movable barrier operator), to name a few).

Pursuant to these teachings, a movable barrier operator and a peripheral alarm system are able to securely communicate with one another. This security, in turn, permits each to rely upon the communications of the other. For example, the peripheral alarm system can rely upon status information from the movable barrier operator and take actions such as disarming its alarm capability with reduced concern that this action may be inappropriate. As another example, the movable barrier operator can rely upon specific operational instructions as may be provided by the peripheral alarm system and take actions that are otherwise contrary to its operating strategy. This, in turn, permits various useful opportunities to leverage the respective capabilities and information sources of both such elements in a way that supplements and benefits one, the other, or both.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. A method for communicating between a peripheral alarm system and a movable barrier operator controlling movement of a movable barrier, the method comprising:

providing a secure encrypted wireless communication link between the movable barrier operator and the peripheral alarm system;

effecting at least one encrypted wireless information communication from the movable barrier operator to the peripheral alarm system using the secure encrypted wireless communication link; and performing a peripheral alarm system action in response to the encrypted wireless information communication from the movable barrier operator to the peripheral alarm system, wherein the moveable barrier operator is configured to receive secure encrypted signals from a user input via a remotely located user interface and wherein effecting the at least one encrypted wireless information communication further comprises providing an instruction from the movable barrier operator to the peripheral alarm system for the peripheral alarm system to take an action, and wherein the method further comprises the peripheral alarm system action providing an encrypted wireless signal over the secure communication link to instruct the movable barrier operator to take an action.

2. The method of claim 1 wherein providing an instruction to the movable barrier operator further comprises providing an instruction regarding subsequent movement of a movable barrier as is controlled, at least in part, by the movable barrier operator.

3. An alarm system comprising:

a movable barrier operator secure encrypted communication link interface;

an alarm system controller that is responsive, at least in part, to data from a movable barrier operator as is received via the movable barrier operator secure encrypted communication link interface;

wherein the alarm system controller comprises an alarm actuator having a corresponding actuation time delay, wherein a first mode of operation of the actuation time delay is alterable, at least in part, in response to reception of data from a movable barrier operator via the movable barrier operator secure encrypted communication link interface.

4. The alarm system of claim 3 wherein the alarm actuator comprises an alarm arming actuator and wherein the data comprises information regarding at least one of:

reception by the movable barrier operator of a remotely transmitted command;

a predetermined state of a movable barrier as is controlled by the movable barrier operator.

5. The alarm system of claim 4 wherein the data comprises information regarding both the reception by the movable barrier operator of the remotely transmitted command and the predetermined state of the movable barrier.

6. The alarm system of claim 3 wherein the alarm actuator comprises an alarm disarming actuator and wherein the data comprises information regarding at least one of:

reception by the movable barrier operator of a remotely transmitted command;

a predetermined state of a movable barrier as is controlled by the movable barrier operator.

7. The alarm system of claim 3 wherein the alarm actuator comprises means for controlling at least one of arming and disarming an alarm capability as a function, at least in part, of movable barrier operator system information as is indicated by the data.

8. The alarm system of claim 7 wherein the movable barrier operator system information corresponds to at least one of:

reception of a remotely sourced movable barrier operator command signal; a current position of a movable barrier;

initiation of movement of the movable barrier; current movement of the movable barrier;

cessation of movement of the movable barrier;

reversal of movement of the movable barrier;

detection of an obstacle in a pathway of the movable barrier;

unauthorized movement of the movable barrier.

9. The alarm system of claim 3 further comprises a movable barrier operator message transmitter that is operably coupled to the alarm system controller.

10. The alarm system of claim 9 wherein the alarm system controller further comprises means for providing a movable barrier operator message to be transmitted by the movable barrier operator message transmitter, wherein the movable barrier operator message is directed to at least one of: the movable barrier operator; a movable barrier operator user.

11. A method for use by an intrusion detection alarm system for communicating with a garage door opener controlling movement of a garage door, the method comprising:

receiving from the garage door opener, via a secure encrypted communication link, information regarding at least one of operational status and received operational commands as corresponds to the garage door opener;

effecting at least one intrusion detection alarm system action in response to the information received from the garage door opener.

12. The method of claim 11 wherein effecting at least one action further comprises effecting a specific action with respect to at least one of arming and disarming an intrusion detection alarm.

13. The method of claim 11 wherein the method further comprises effecting at least one an external communication.

14. The method of claim 13 wherein transmitting an external communication further comprises transmitting at least one of: a command to the garage door opener; an inquiry to the garage door opener; a command to a peripheral alert mechanism; a message.

15. The method of claim 11 wherein the-encrypted secure communication link is wireless.

* * * * *

UNITED STATES PATENT AND TRADEMARK OFFICE

CERTIFICATE OF CORRECTION

PATENT NO. : 7,482,923 B2
APPLICATION NO. : 11/044928
DATED : January 27, 2009
INVENTOR(S) : James J. Fitzgibbon It is certified that error appears in the above-identified patent and that said Letters Patent is hereby corrected as shown below:

TITLE PAGE:

Line (73) Assignee: -- Change “The Chamberlain Group, inc.” to -- The Chamberlain Group, Inc. --;

Column 2, Section (56), Other Publications: change “www.brinkshomesecurity.com/home-security-systems-and-pricing/security-equipjent/security-equipment.htm”
to
-- www.brinkshomesecurity.com/home-security-systems-and-pricing/security-equipment/security-equipment.htm --; and

IN THE CLAIMS:

Claim 15, Column 8, Line 12 -- Change “the-encrypted” to -- the encrypted --.

Signed and Sealed this

Thirtieth Day of June, 2009

JOHN DOLL
*Acting Director of the United States Patent and Trademark Office*